Feb. 13, 1968    J. F. GILMORE ETAL    3,369,143
INSTANT-START FLUORESCENT LAMP HAVING MIXED FILL GAS
AND IMPROVED ELECTRODE STRUCTURE
Original Filed Aug. 20, 1963

INVENTORS
John F. Gilmore
Frederick W. Hoeh
BY
D. S. Buley

United States Patent Office 3,369,143
Patented Feb. 13, 1968

3,369,143
INSTANT-START FLUORESCENT LAMP HAVING MIXED FILL GAS AND IMPROVED ELECTRODE STRUCTURE
John F. Gilmore, Verona, and Frederick W. Hoeh, Livingston, N.J., assignors to Westinghouse Electric Corporation, Pittsburgh, Pa., a corporation of Pennsylvania
Continuation of application Ser. No. 303,262, Aug. 20, 1963. This application Feb. 28, 1967, Ser. No. 619,482
7 Claims. (Cl. 313—206)

ABSTRACT OF THE DISCLOSURE

An instant-start type fluorescent lamp having an argon-neon fill gas and a single anode at each end that is connected in series with the cathode and single-contact components located at the respective ends of the lamp.

Cross-reference to related application

This application is a continuation of application Ser. No. 303,262 filed Aug. 20, 1963, now abandoned.

Background of the invention

This invention relates in general to electric discharge lamps and has particular reference to fluorescent lamps of the instant-start type.

Instant-start fluorescent lamps are well known in the art and differ from rapid start and conventional "preheat" type lamps in that starting is effected solely by means of the voltage applied across the cathodes without first heating the latter. Since no preheating circuit is required only one contact at each end of the lamp is needed and single-pin type bases are usually employed. As presently manufactured, such lamps are filled with argon at a pressure of about three millimeters and employ mounts consisting of the usual reentrant glass stem having a pair of lead wires sealed therethrough and a triple-wound coil that is attached to the inner ends of the lead wires and coated with electron-emissive material. The outer ends of the leads are connected together within the base and attached to the base pin. Since end blackening and electrode losses do not constitute serious problems in such argon-filled lamps, no anodes or shields of any kind were heretofore required or used.

It has recently been recognized that the light output of a fluorescent lamp at conventional loadings can be increased by substituting up to about 50% of the argon fill gas with neon, as disclosed in U.S. Patent No. 3,012,-165 issued December 5, 1961, to Schmidt and entitled "Fluorescent Lamp Gas Filling." However, attempts to increase the light output of instant-start type or so-called "slimline" fluorescent lamps by using such a mixed fill gas and conventional mounts failed because the neon shortened the lamp life and increased the electrode losses, thus reducing instead of increasing the efficiency of the lamp.

The addition of large anodes to each of the lead wires in accordance with the usual practice failed to solve the problem since they reduced the cathode operating temperature, resulting in a corresponding increase in the cathode fall. This, in turn, increased the positive ion bombardment and sputtering of the cathode and lead wires and decreased the lamp life.

Summary of the invention

It is, accordingly, the general object of the present invention to avoid the foregoing difficulties of the prior art by providing an instant-start type fluorescent lamp having an improved electrode structure which will enable mixed fill gases to be used without decreasing either the efficiency or life of the lamp.

The foregoing objectives, and other advantages that will become apparent to those skilled in the art, are achieved in accordance with this invention by connecting only one end of the cathode to the base contact and employing a single anode that is connected to the opposite end of the cathode. Thus, the anode and cathode at each end of the lamp are connected in series with each other and with the respective base contacts so that all of the anode current on the anode half cycle flows through the cathode. This raises the temperature of the cathode and reduces the cathode fall. The resultant decrease in sputtering and end blackening, coupled with the reduced anode fall achieved by using a separate anode and the increased light output effected by the neon additive, provides a lamp of improved efficiency and life.

Brief description of the drawing

A better understanding of the invention will be obtained by referring to the accompanying drawing, wherein.

While the present invention can be advantageously used in various types of electric discharge devices, it is especially adapted for use in connection with instant-start type fluorescent lamps and has accordingly been so illustrated and will be so described.

Embodiment I

Figure 1:
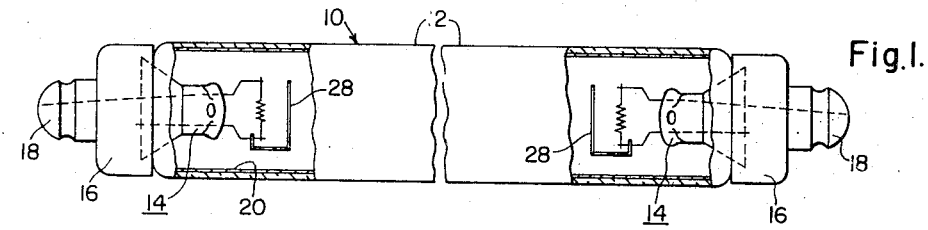
FIGURE 1 is a fragmentary elevational view of an instant-start fluorescent lamp embodying one form of the present invention, portions of the lamp envelope being broken away to expose the mounts.

In FIGURE 1 there is shown an instant-start, or so-called "slimline," fluorescent lamp 10 which embodies the present invention and consists of the usual tubular envelope 12 having a mount 14 sealed into each of its ends. A suitable base member 16 having a single contact such as a pin 18 is attached to each end of the envelope and the inner surface of the envelope 12 is coated with a layer 20 of suitable phosphor in the usual manner. A predetermined quantity of mercury is also sealed within the envelope in accordance with standard lamp-making practice.

Figure 4:
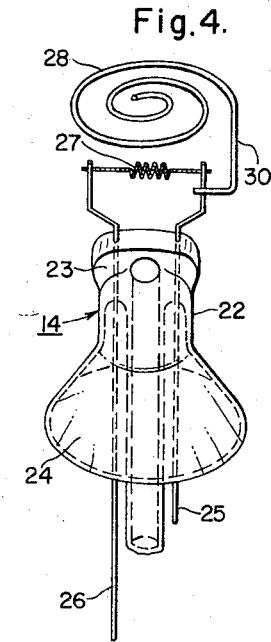
FIGURE 4 is a perspective view of the mount prior to being sealed into the end of the envelope.

As shown more particularly in FIGURE 4, the lamp mount 14 per se consists of a reentrant vitreous stem 22 fabricated from a suitable glass and having a press 23 at one end and a flared skirt 24 at its opposite end. A pair of lead wires 25, 26 are sealed through the stem press and have their inner end portions bent into divergent arms that are attached to opposite ends of a conventional triple-wound cathode 27 of tungsten wire or the like that is coated with emission material. In accordance with this embodiment of the invention, one of the leads (the lead 25 as here shown) is shorter than the other and this short lead has attached to its inner end portion an enlarged anode 28 of spiral configuration. The anode is mounted a predetermined distance in front of the cathode by a support member 30. The support member and anode can be fabricated from a single piece of wire, as here shown, or they may comprise separate elements that are joined together as by welding.

Figure 2:
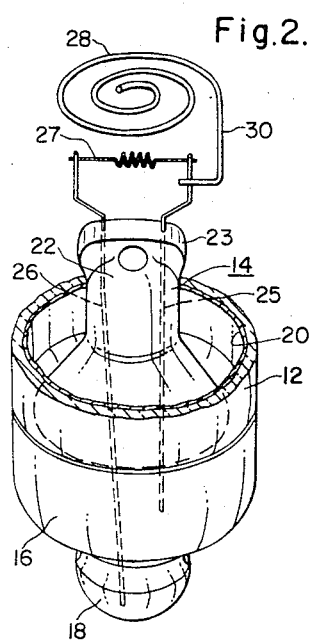
FIGURE 2 is an enlarged perspective view of one of the lamp mounts.
Figure 3:
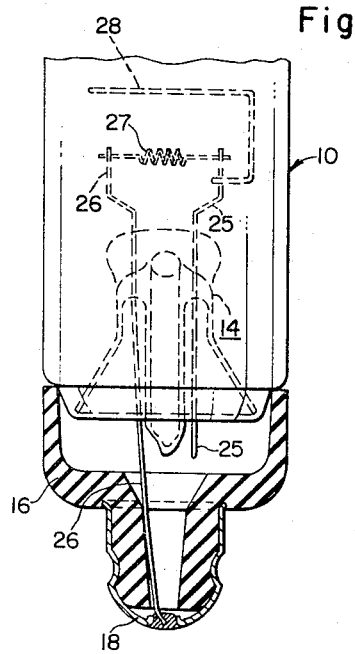
FIGURE 3 is an elevational view of one end of the lamp shown in FIGURE 1 with the base shown in cross section to illustrate the manner in which the base pin is connected to the cathode.

As shown more particularly in FIGURES 2 and 3, the short lead 25 is merely recessed within the base 16 and terminates short of the pin contact 18, whereas the longer lead 26 is connected as by soldering to the pin contact. The base member can be of all plastic construction with a metal ferrule comprising the contact as here shown and as disclosed in detail in U.S. Patent No. 2,477,340 to Makenny.

The cathode 27 and anode 28 are, accordingly, connected in series with each other and with the base contact 18. Thus, on the anode half cycle of operation all of the anode current passes through the cathode thereby maintaining its temperature at a high value and decreasing the cathode fall. At the same time, the anode fall is reduced by the presence of the large anode so that both types of electrode losses are minimized. It will also be observed that all of the cathode current necessarily flows from the "hot" spot through the remainder of the coil to the "hot" lead 26 thereby locally heating this portion of the cathode to a higher temperature and further reducing the cathode fall. The improvement obtained with this mount construction enables up to 50% of the argon fill gas to be replaced with neon without the loss in efficiency or shortened life which would otherwise occur when such a mixed fill gas is used.

If a spiral type anode 28 of the type shown in FIGURES 1 to 4 is employed, the turns defining the spiral are preferably located in a plane that is transverse to the stem axis and located a predetermined distance, as for example one-fourth inch, in front of the elongated cathode 27 which is also disposed transverse to the stem axis. The amount of neon in the fill gas can vary from about 10% to 50% in accordance with the aforementioned Schmidt patent.

*Embodiment II*

Figure 5:
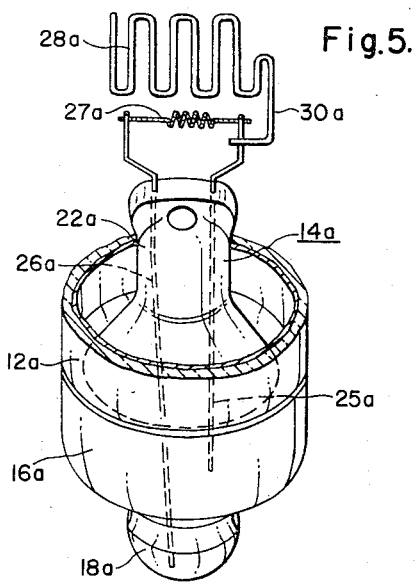
FIGURES 5 and 6 illustrate alternative embodiments of the invention employing different types of anode structures.

Other types of anodes can also be employed with the same beneficial results. For example, an anode 28a of retroverted or sinusoidal configuration can be supported in front of and in substantially parallel spaced relationship with the elongated cathode 27a by a suitable support wire 30a, as shown in FIGURE 5. The construction of the alternative mount 14a thus provided is the same in all other respects as that previously described above in connection with Embodiment I.

*Embodiment III*

Figure 6:
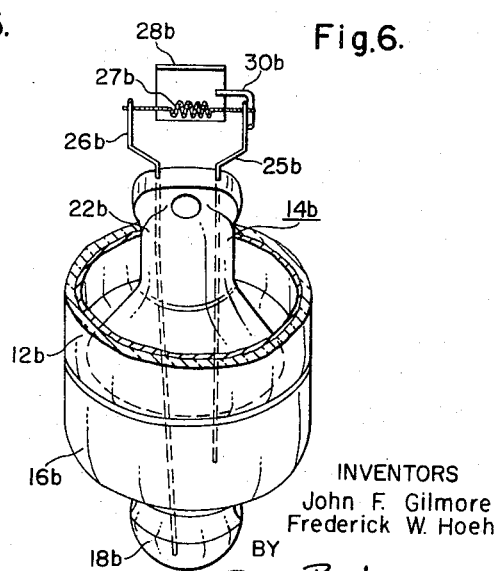

As shown in FIGURE 6, the anode can also comprise a generally rectangular plate 28b of stainless steel or the like that is supported, as by means of a support wire 30b attached to the short lead 25, in side-by-side parallel spaced relationship with the cathode 27b to provide another form of mount 14b. In this case, the anode is disposed on and extends along one side of the cathode.

As a specific example of this latter type construction an instant-start "slimline" fluorescent lamp approximately 96 inches in length and having an envelope 1½ inches in diameter was provided with a plate anode of #420 stainless steel spaced about ¼ inch away from and on one side of the cathode. The lamp was filled with a 35% neon-65% argon gas mixture at approximately 3 mm. pressure. Comparative performance data on this particular lamp, a conventional argon-filled lamp of the same size, and one having the mixed fill gas and regular mounts without anodes are given below in Table I.

TABLE I

| Lamp Construction | Efficiency | Relative Light Output |
| --- | --- | --- |
| No anodes; argon fill | 76.5 L/W | 100.0 |
| No anodes; 35 Ne–65 A fill | 75.8 L/W | 103.5 |
| Single anodes; 35 Ne–65 A fill | 77.2 L/W | 104.7 |

It will be noted from the foregoing data that the lamp with the mixed fill gas and the plate anodes connected in series with their respective cathodes in accordance with the invention is clearly superior to the other lamps with respect to both efficiency and light output.

It will be appreciated from the foregoing that the objects of the invention have been achieved in that an improved instant-start fluorescent lamp containing a mixed fill gas including neon has been provided, which lamp includes a novel mount construction that obviates the electrode loss and short life problems normally encountered with the use of such a fill gas.

While several embodiments have been illustrated and described, various modifications in both the configuration and construction of the mount and anode structures can be made without departing from the spirit and scope of the invention. For example, a conventional bipin base instead of a single-pin base can be used providing only the long or "hot" lead wire is connected to the pins and the latter are connected to one another.

We claim:
1. An instant-start fluorescent lamp that has a single contact at each end and is adapted to be started solely by means of an applied voltage without the aid of preheating current, said lamp comprising;
   an envelope containing a predetermined quantity of mercury and an inert starting gas comprising a mixture of argon and neon wherein neon constitutes at least 10% of said mixture,
   a cathode supported at each end of said envelope by a pair of lead wires that are sealed through the proximate walls of said envelope and are fastened to the ends of the respective cathodes,
   a base on each end of said envelope connecting said contact to only one of the associated pair of lead wires, and
   a single anode supported a predetermined distance from each of said cathodes and connected to the end thereof that is fastened to the other of said associated pair of lead wires whereby each of said cathodes is connected in series with the single anode and contact located at that end of the lamp.

2. An instant-start fluorescent lamp as set forth in claim 1 wherein; said envelope is of tubular configuration, and said anodes are larger than and extend inwardly beyond the respective cathodes.

3. In an instant-start fluorescent lamp that has a single contact at each end and is adapted to be started solely by means of an applied voltage without the aid of preheating current, the combination of;
   a fill gas comprising a mixture of argon and neon containing from 10% to 50% neon,
   a pair of spaced elongated cathodes,
   a single anode of planar configurations disposed adjacent each of said cathodes and spaced a predetermined distance therefrom,
   and means supporting said anodes in said position and electrically connecting them in series with the adjacent cathodes and contact at the respective ends of the lamp whereby all of the anode current on the anode half cycle of operation passes through the respective cathodes and the cathode and anode fall are reduced, at least a portion of each of said anodes being disposed in front of its associated cathode.

4. The combination set forth in claim 3 wherein said anodes and cathodes are disposed in planes which extend transversely of the lamp axis.

5. The combination set forth in claim 4 wherein each of said anodes comprises a metal plate that is disposed at and extends along one side of the respective cathodes and is spaced approximately ¼ of an inch therefrom.

6. The combination set forth in claim 4 wherein each of said anodes comprises a wire grid of spiral configuration that is disposed in a plane that lies in front of and is spaced approximately ¼ of an inch from their respective cathodes.

7. The combination set forth in claim 4 wherein each of said anodes comprises a wire grid of sinusoidal configuration that is disposed in a plane that lies in front of and is spaced approximately ¼ of an inch from their respective cathodes.

References Cited
UNITED STATES PATENTS

| | | | |
|---|---|---|---|
| 2,135,701 | 11/1938 | Elenbaas et al. | 313—205 X |
| 2,935,637 | 5/1960 | Cortese | 313—109 X |
| 3,012,165 | 12/1961 | Schmidt | 313—109 X |
| 3,121,184 | 2/1964 | Fox | 313—109 X |

JAMES D. KALLAM, *Primary Examiner.*

A. J. JAMES, *Assistant Examiner.*